US012268198B1

(12) United States Patent
Gaines

(10) Patent No.: US 12,268,198 B1
(45) Date of Patent: Apr. 8, 2025

(54) SYSTEM AND METHOD FOR MINIATURE FISHING CATAMARAN

(71) Applicant: Herbert W. Gaines, Las Vegas, NV (US)

(72) Inventor: Herbert W. Gaines, Las Vegas, NV (US)

( * ) Notice: Subject to any disclaimer, the term of this patent is extended or adjusted under 35 U.S.C. 154(b) by 56 days.

(21) Appl. No.: 18/107,840

(22) Filed: Feb. 9, 2023

Related U.S. Application Data

(60) Provisional application No. 63/359,853, filed on Jul. 10, 2022.

(51) Int. Cl.
A01K 91/02 (2006.01)
A01K 73/04 (2006.01)
A01K 91/08 (2006.01)

(52) U.S. Cl.
CPC ............. A01K 91/02 (2013.01); A01K 73/04 (2013.01); A01K 91/08 (2013.01)

(58) Field of Classification Search
CPC ...... A01K 91/02; A01K 91/08; A01K 91/053; A01K 73/04; B63B 1/125; B63B 2001/208
USPC .............................. 43/43.12, 43.13, 9.7, 26.1
See application file for complete search history.

(56) References Cited

U.S. PATENT DOCUMENTS

| 1,307,623 | A | * | 6/1919 | Edmondson | A01K 91/08 43/43.13 |
| 1,723,236 | A | * | 8/1929 | Hansen | A01K 91/06 43/9.7 |
| 1,850,296 | A | * | 3/1932 | Vermeulen | A01K 91/065 43/43.11 |
| 2,327,789 | A | * | 8/1943 | Hixon | A01K 93/00 43/43.13 |
| 2,420,451 | A | * | 5/1947 | Spenard | A01K 91/065 43/26.1 |
| 2,572,427 | A | * | 10/1951 | Anglim | A01K 91/08 43/43.13 |
| 2,582,754 | A | * | 1/1952 | Kahler | A01K 91/08 114/355 |
| 2,597,288 | A | * | 5/1952 | Caldwell | A01K 93/00 43/43.12 |
| 2,693,047 | A | * | 11/1954 | Lumsden | A01K 91/065 43/26.1 |
| 2,707,348 | A | * | 5/1955 | Kalder | A01K 91/08 43/43.13 |
| 2,709,316 | A | * | 5/1955 | McCabe | A01K 91/065 43/43.11 |
| 2,749,648 | A | * | 6/1956 | Schneider | A01K 91/08 43/43.12 |
| 2,958,976 | A | * | 11/1960 | Adams | A01K 95/00 24/615 |
| 2,965,998 | A | * | 12/1960 | Kuismi | A01K 91/08 43/43.13 |
| 3,142,929 | A | * | 8/1964 | Killilea | A01K 91/08 43/43.13 |

(Continued)

Primary Examiner — Darren W Ark
Assistant Examiner — William L Gmoser
(74) Attorney, Agent, or Firm — Bold IP PLLC; Christopher Mayle

(57) ABSTRACT

A system and method for a fishing catamaran used for bank fishing or other activities that may be sent or placed at a specific desired location whereby the fishing catamaran would have a rear quick release mechanism designed to detach the fishing line when a force is applied by a fish.

5 Claims, 5 Drawing Sheets

(56) References Cited

U.S. PATENT DOCUMENTS

| | | | | |
|---|---|---|---|---|
| 3,193,964 A * | | 7/1965 | Hurst | A01K 91/08 43/43.12 |
| 3,216,147 A * | | 11/1965 | Minera | A01K 91/06 43/43.13 |
| 3,218,751 A * | | 11/1965 | Walker | A01K 95/00 43/43.11 |
| 3,462,870 A * | | 8/1969 | Terilli | A01K 91/02 43/43.11 |
| 3,507,068 A * | | 4/1970 | Roberts | A01K 91/08 43/17 |
| 3,599,369 A * | | 8/1971 | Carlson | A01K 97/01 43/17 |
| 3,643,370 A * | | 2/1972 | Cook | A01K 95/00 43/43.12 |
| 3,659,370 A * | | 5/1972 | Ritter | A01K 95/00 24/537 |
| 3,739,516 A * | | 6/1973 | Holling | A01K 91/02 43/26.1 |
| 3,748,775 A * | | 7/1973 | Wagner | A01K 91/08 43/43.13 |
| 3,760,762 A * | | 9/1973 | Spongberg | A01K 91/08 43/43.13 |
| 3,778,918 A * | | 12/1973 | Emory, Sr. | A01K 91/08 43/43.12 |
| 3,816,954 A * | | 6/1974 | Bissonette | A01K 91/08 43/43.12 |
| 3,818,624 A * | | 6/1974 | Duffy | A01K 91/08 43/43.13 |
| 3,835,573 A * | | 9/1974 | Borchardt | A01K 91/08 43/43.12 |
| 3,879,884 A * | | 4/1975 | Tucker, Sr. | A01K 91/08 43/43.12 |
| 3,883,981 A * | | 5/1975 | Bohn | A01K 91/08 43/43.12 |
| 3,892,083 A * | | 7/1975 | Peterson | A01K 91/08 43/43.11 |
| 3,973,347 A * | | 8/1976 | Kearney | A01K 93/02 D22/148 |
| 3,990,380 A * | | 11/1976 | Regan | B63B 1/125 114/61.22 |
| 4,012,863 A * | | 3/1977 | Lori | A01K 91/08 43/43.11 |
| 4,065,869 A * | | 1/1978 | Berry | A01K 91/08 43/43.12 |
| 4,161,077 A * | | 7/1979 | Ciaccio | A01K 91/02 43/26.1 |
| 4,255,890 A * | | 3/1981 | Smith | A01K 91/08 43/43.12 |
| D258,979 S * | | 4/1981 | Scola | D22/146 |
| 4,339,888 A * | | 7/1982 | Sheng-Jung | A01K 91/02 43/26.1 |
| 4,648,194 A * | | 3/1987 | Carroll, Jr. | A01K 91/02 43/4.5 |
| 4,696,124 A * | | 9/1987 | Wille | A01K 91/08 43/43.12 |
| 4,703,580 A * | | 11/1987 | Kammeraad | A01K 91/08 43/43.13 |
| 4,757,633 A * | | 7/1988 | Van Cleve | A01K 91/02 43/26.1 |
| 4,763,437 A * | | 8/1988 | Cuda | A01K 91/02 43/17 |
| 5,018,296 A * | | 5/1991 | Putz, II | A01K 91/08 43/43.12 |
| 5,086,581 A * | | 2/1992 | Barra | A01K 91/02 43/41.2 |
| 5,170,581 A * | | 12/1992 | Lyons | A01K 91/08 43/43.12 |
| 5,341,591 A * | | 8/1994 | Hicks | A01K 91/08 43/9.7 |
| 5,363,587 A * | | 11/1994 | Nordling | A01K 91/02 43/26.1 |
| 5,375,365 A * | | 12/1994 | Bronder | A01K 95/00 43/43.12 |
| 5,806,232 A * | | 9/1998 | James | A01K 91/02 43/26.1 |
| 5,867,932 A * | | 2/1999 | Reiger | A01K 91/08 43/43.1 |
| 6,263,611 B1 * | | 7/2001 | Kimura | A01K 91/02 43/26.1 |
| 6,988,456 B1 * | | 1/2006 | Schooler | B63H 20/007 114/344 |
| 7,367,153 B1 * | | 5/2008 | Koch, III | A01K 73/045 43/43.13 |
| 7,849,629 B1 | | 12/2010 | Adcock | |
| 9,131,672 B1 * | | 9/2015 | Kagan | A01K 89/00 |
| 10,112,690 B1 * | | 10/2018 | Garrett | B63C 13/00 |
| 10,626,901 B2 * | | 4/2020 | Norris | F16B 5/0266 |
| 2004/0016171 A1 | | 1/2004 | Waxmanski | |
| 2004/0083642 A1 * | | 5/2004 | Huikari | A01K 91/02 43/26.1 |
| 2005/0166443 A1 * | | 8/2005 | Shen | A01K 91/02 43/26.1 |
| 2006/0243183 A1 * | | 11/2006 | Eveleth | B63B 1/36 114/102.1 |
| 2008/0271357 A1 * | | 11/2008 | Easterby | A01K 91/02 43/26.1 |
| 2009/0165356 A1 * | | 7/2009 | Blum | A01K 91/047 43/26.1 |
| 2014/0259863 A1 | | 9/2014 | Martinez | |
| 2020/0115008 A1 * | | 4/2020 | Oldham | B63B 71/00 |
| 2021/0107608 A1 * | | 4/2021 | Spencer | B63H 11/00 |

* cited by examiner

SYSTEM AND METHOD FOR MINIATURE FISHING CATAMARAN

CROSS REFERENCE TO RELATED APPLICATIONS

This application claims priority to U.S. Provisional Patent No. 63/359,853 filed on Jul. 10, 2022, which is incorporated in its entirety.

FIELD OF DISCLOSURE

The overall field of this invention is a system and method for a miniature catamaran used for fishing along banks and more particularly to a miniature catamaran to allow for bank fishing at greater distances with quick release springs that release fishing lines when a pound of pressure is applied by a fish that has snagged the line.

BACKGROUND

In the recreation activity or sport of fishing, the conventional way to get a fishing bait to a particular location is to cast the bait. Casting generally involves a complex set of steps using arm and wrist motion to whip the tip of a fishing pole in a desired direction coupled with complex hand motions that control the fishing line as it unwinds from the reel. The length of the cast, that is, the distance the bait travels, is dependent on the force of the cast (often a function of the fisher's arm and wrist strength) and other external factors, such as the weight of the bait and winds. For even the most experienced fisher, casting can be difficult and require tons of practice.

Thus, it would be advantageous to provide a bait delivery system that eliminates the complexity of casting and can deliver a fishing device to a desired location. Furthermore, it would be advantageous to provide a system that allows the fishing line to be detached from the fishing device.

SUMMARY

It is an object of the present description to provide a system and method for a fishing catamaran used for bank fishing or other activities that may be sent or placed at a specific desired location whereby the fishing catamaran would have a rear quick release mechanism designed to detach the fishing line when a force is applied by a fish.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

Figure 1:
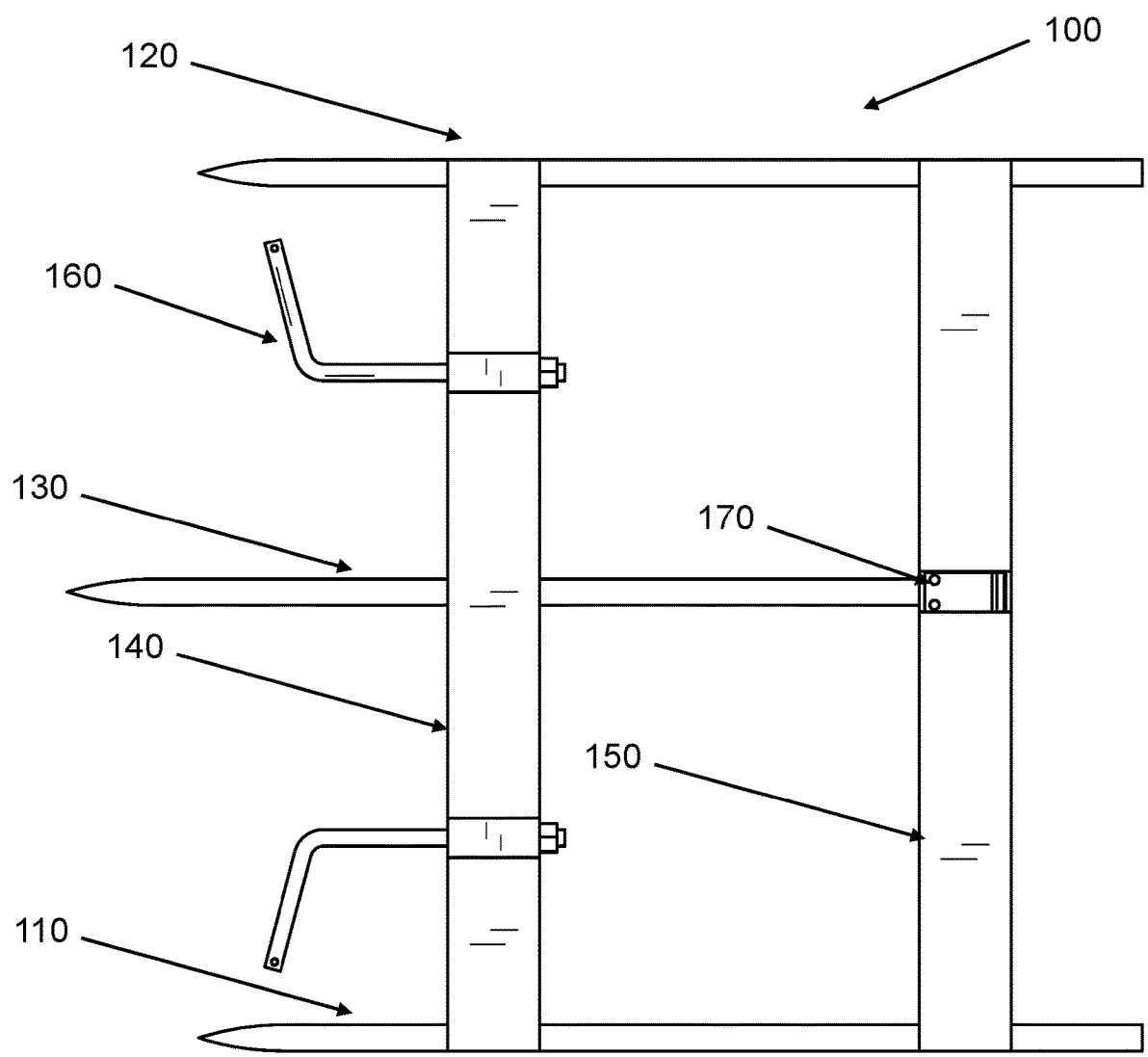
FIG. 1 shows a top view illustration of the fishing catamaran.
Figure 2:
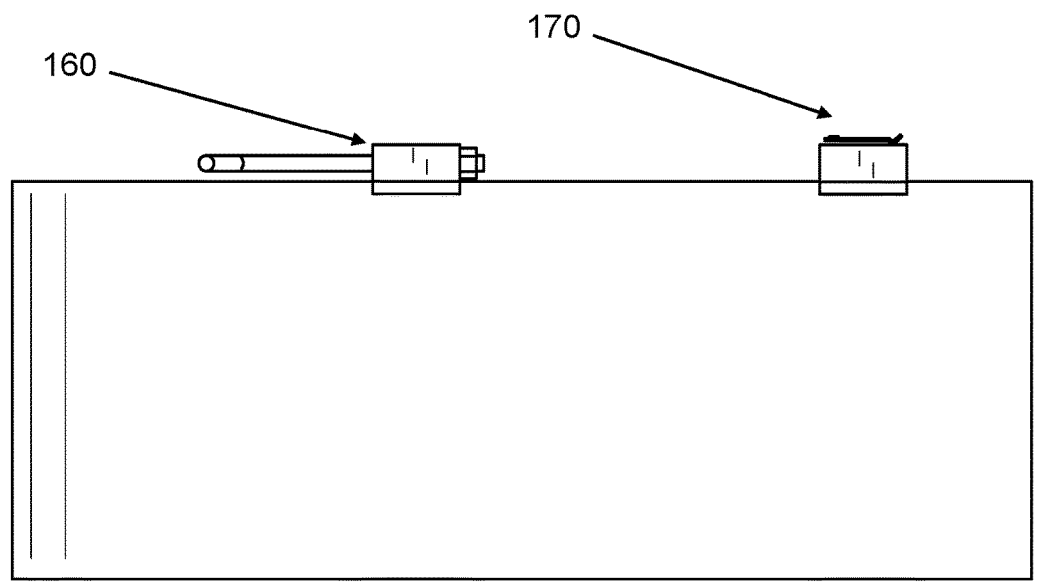
FIG. 2 shows a side view of the fishing catamaran.

In the Summary above and in this Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" is used herein to mean "serving as an example, instance, or illustration." Any aspect described in this document as "exemplary" is not necessarily to be construed as preferred or advantageous over other aspects Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any item, so a "set of items" may indicate the presence of only one item or may indicate more items. Thus, the term "set" may be equivalent to "one or more" as used herein.

In the following detailed description, numerous specific details are set forth in order to provide a more thorough understanding of the one or more embodiments described herein. However, it will be apparent to one of ordinary skills in the art that the invention may be practiced without these specific details. In other instances, well-known features have not been described in detail to avoid unnecessarily complicating the description.

Turning to FIG. 1, FIG. 1 shows an embodiment of a system and method for Miniature catamaran 100 in accordance with the present invention. Miniature catamaran 100 may be made of wood, aluminum, steel, fiberglass, or a combination of these materials as well as any other suitable material for navigating water. In one or more non-limiting embodiments, miniature catamaran 100 may be made of but not limited to 16" long 1" by 7" pine boards (2), 20" long ¼" by 1½" poplar slats (2), 1½" long ¾" by ¾" pine blocks (2), 4" long ¼" by ¼" pine sticks (2), 8½" long by ¼" diameter aluminum rods (2), #216—½" eye screw (2), 2 split ring at washers (1), 1¼" lock nut, 1 half inch swivel (1), 10" long by ³⁄₆₄" diameter stainless steel wire (1), 1" wood screws (4), 1" pin nails (2), ½" long by ³⁄₆₄" diameter carter pins (2), milliliters of wood glue (1), and ¼ pint of exterior oil based paint.

Miniature catamaran 100 may be constructed by sanding the 1 inch by 7"×16" long pine boards. From one end of the pine boards measure 3 inches then use a speed square transfer that 3-inch marks all the way around the board top sides and bottom. The top of the board measures 1 inch across the top and bottom. Then scribe an evolute radius from the 3" mark to the front center of your board on the top and the bottom. Then take the board to the belt sander and sand off all the excess wood to the evolute radius. The process may then be completed for the other two boards. The 16" long by ¾" thick by 7" high pine boards are what keep Miniature catamaran 100 buoyant. The two 20" long by ¼"

thick by 1½" wide poplar slats, help to tie the 16" long pine boards together to form miniature catamaran 100 that coasts on top of the water.

Next take the 20" long by ¼" thick by 1½" wide slats and put measurements for the 7/32" holes that need to be drilled. The two 4" long by ¼" by ¼" are shaped in a way and fastened to the bottom of miniature catamaran 100 on both the left and right side of miniature catamaran 100 to help steer and stabilize Miniature catamaran 100. The 1½" long by ¾" by ¾" pine blocks hold the necessary hardware for miniature catamaran 100 to work properly. The front two 1½" long by ¾" by ¾" pine blocks have a 1½" hole drilled through them so the 8½" long by ¼" diameter aluminum rods may be inserted. Also, the 1½" long by ¾" by ¾" thick pine blocks have two 7/32" holes drilled ¾" through them to receive the two ¾" wood screws, that hold them securely to the 20" by ¼" thick by 1½" wide slat that ties the 16" long by ¾" thick by 7" high pine boards together.

Before inserting the two 8½" by ¼" diameter aluminum rods into the 1½" by ¾" by ¾" pine blocks, the user should get a standard threader and thread one end of the aluminum rod the distance of ½" from one end to receive the ¼" lock nut that holds the aluminum rod in place. On the other end, drill a ⅛" hole in the ¼" aluminum rods. Now the user gets one more of the 1½" by ¾" by ¾" pine blocks and drills 7/32" hole in the center of the block. The different components may then be constructed together.

When assembled, miniature catamaran 100 may have three components that extend downward into the water when floating, as illustrated in FIG. 1. A first component 110 on the left side, a second component 120 on the right side, and a third component 130 between them. First component 110 and second component 120 may be parallel to one another with respect to third component 130. Third component 130 may extend farther forward than first component 110 and second component 120 but first component 110 and second component 120 may extend more rearward. First component 110, second component 120, and third component 130 may have a rectangular prism in shape with a narrowed portion at the front end.

A first plank 140 that is rectangle and elongated in shape may extend between and be connected to a top of first component 110 and second component 120 whereby first plank 140 may extend over third component 130. A second plank 150 having the same shape as first plank 140 may extend between and be connected to a top of first component 110 and second component 120 whereby second plank 150 may extend over third component 130. First plank 140 may be more forward than second plank 150.

Figure 5:
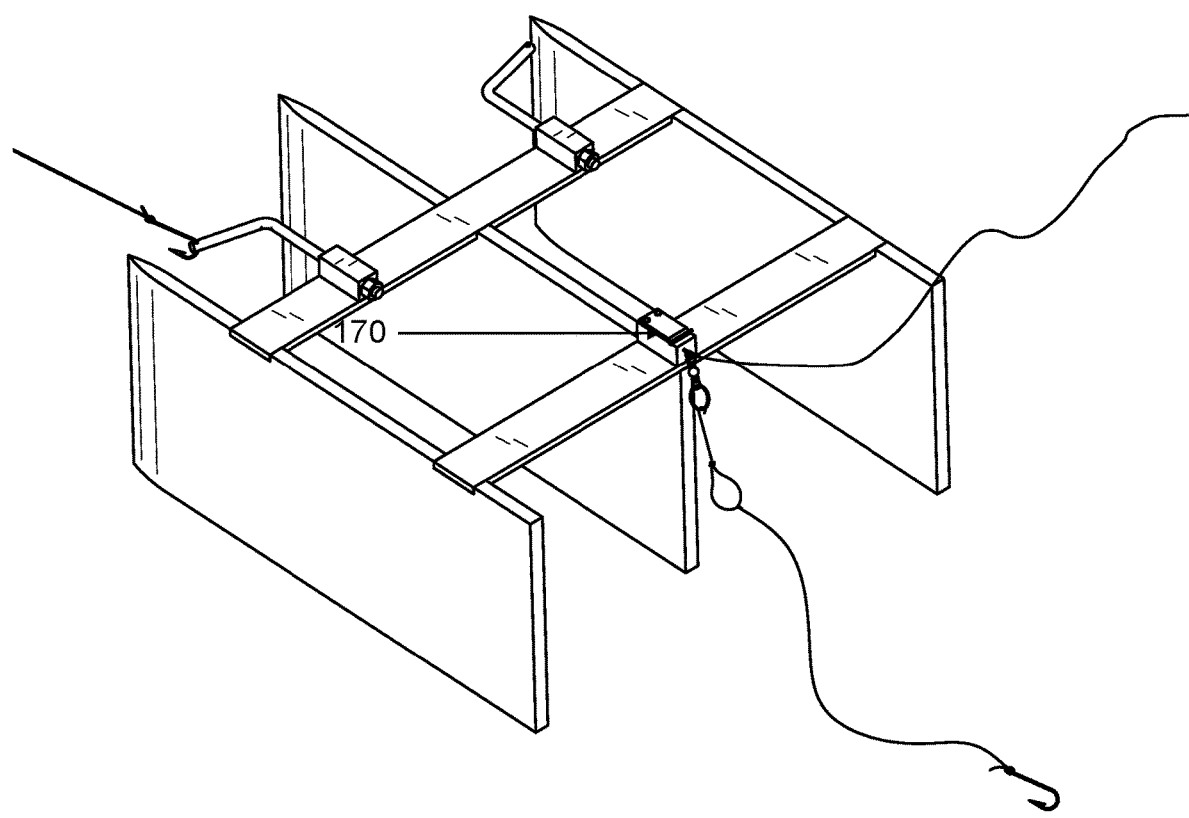
FIG. 5 shows a perspective view of the fishing catamaran in use.

Miniature catamaran 100 when constructed may have two protrusions 160 that bend at 45 degree angles in opposing diagonal directions at a front and top of first plank 140 that may be used to steer or guide miniature catamaran 100 using a hook or other apparatus as shown in FIG. 5.

Miniature catamaran 100 may have a quick release mechanism at the rear of miniature catamaran 100. The quick release mechanism may be designed to hold a fishing line until enough force is applied whereby the loop then deforms and the fishing line may escape. The quick release mechanism may be a ten inch metal wire with two end portions that have been bent into a loop whereby a top end of the wire is positioned over a ringlet that is connected to a fastener at the rear of the catamaran. When a pound of force is applied to the wire loop at the bottom end, the loops separate and the fishing line may be moved away from the bottom wire loop.

In other non-limiting embodiments or the same embodiment, a flexible piece 170 may be placed on a slat portion on the second plank. Flexible piece 170 may have a fastener through flexible piece 170 into miniature catamaran 100 whereby the ends are stationary and lie flat unless a force is applied. The fishing line may be placed under flexible piece 170 whereby when force is applied, flexible piece 170 may slightly bend allowing the fishing line to pass underneath flexible piece 170. Once the force is no longer applied flexible piece 170 moves back to the original position.

Figure 3:
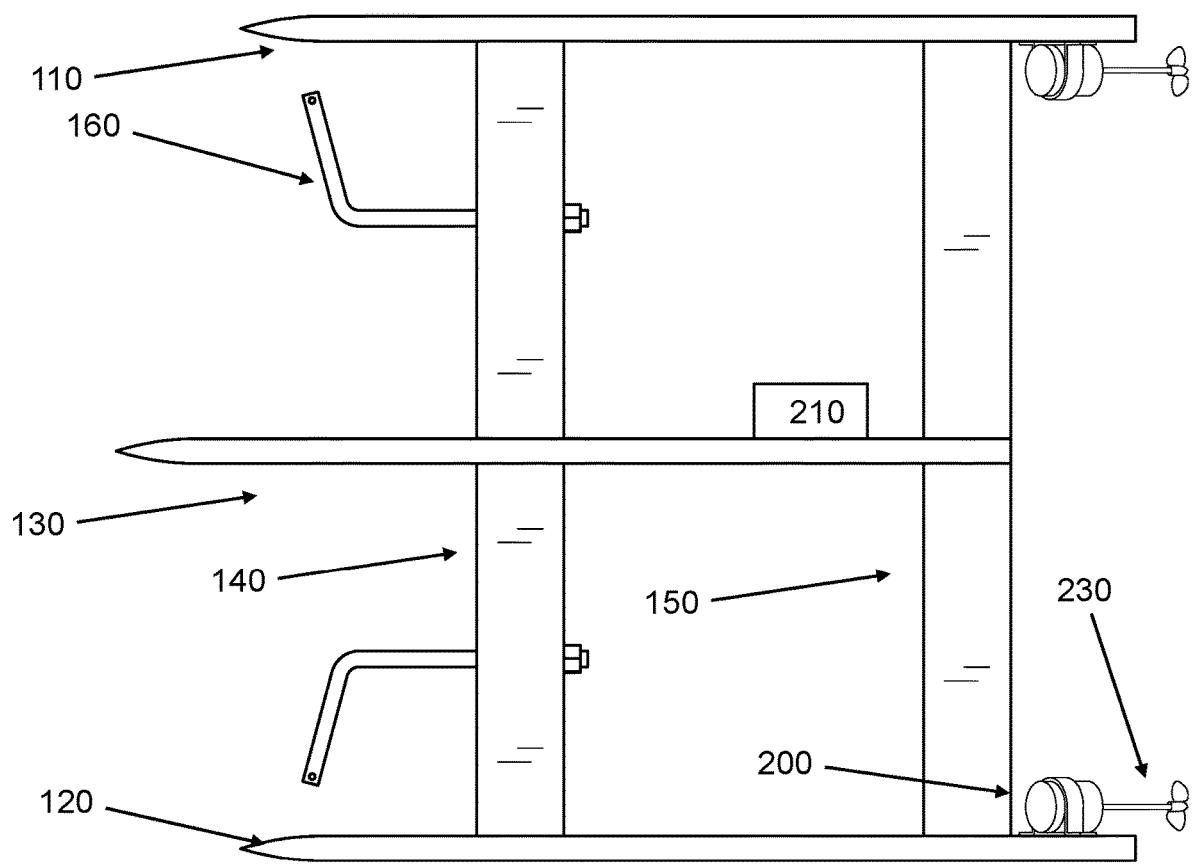
FIG. 3 shows a bottom view of the fishing catamaran.
Figure 4:
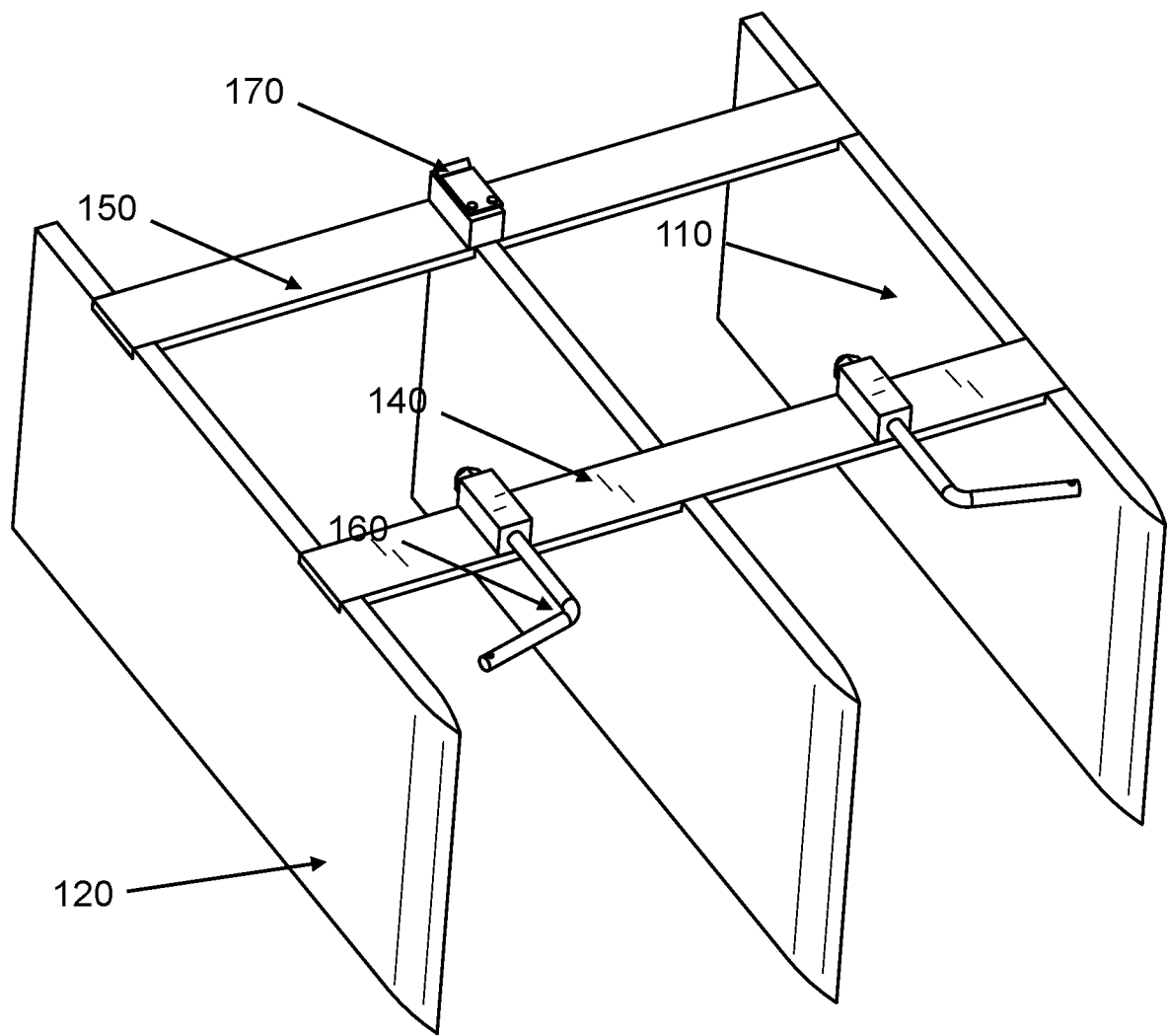
FIG. 4 shows a perspective view of the fishing catamaran.

Miniature catamaran 100 may have a propulsion system in some embodiments as illustrated in FIG. 3, which is used to propel and maneuver Miniature catamaran 100. The propulsion system may have a power source such as a battery 210 that supplies a motor 200 with power. The motor 200 turn propeller shafts, which are connected to propellers 230. Miniature catamaran 100 is maneuvered by controlling the propellers 230. Other propulsion systems and maneuvering mechanisms may also be used.

Miniature catamaran 100 may have a remote control for controlling the remotely controlled miniature catamaran. The remote control technology for controlling a vehicle of this type is well known. Miniature catamaran 100 may have a remote control receiver which receives signals from a remote control module, discussed below, aided by one or more antennas. The remote control receiver converts the received signals into commands for the propulsion system. The remote control module controls the movement, such as forward, reverse, left, and right directions of miniature catamaran 100. In one or more non-limiting embodiments, remote control module may be a computing device such as a phone that is connected to miniature catamaran 100 by a communication system receiver.

Figure 6:
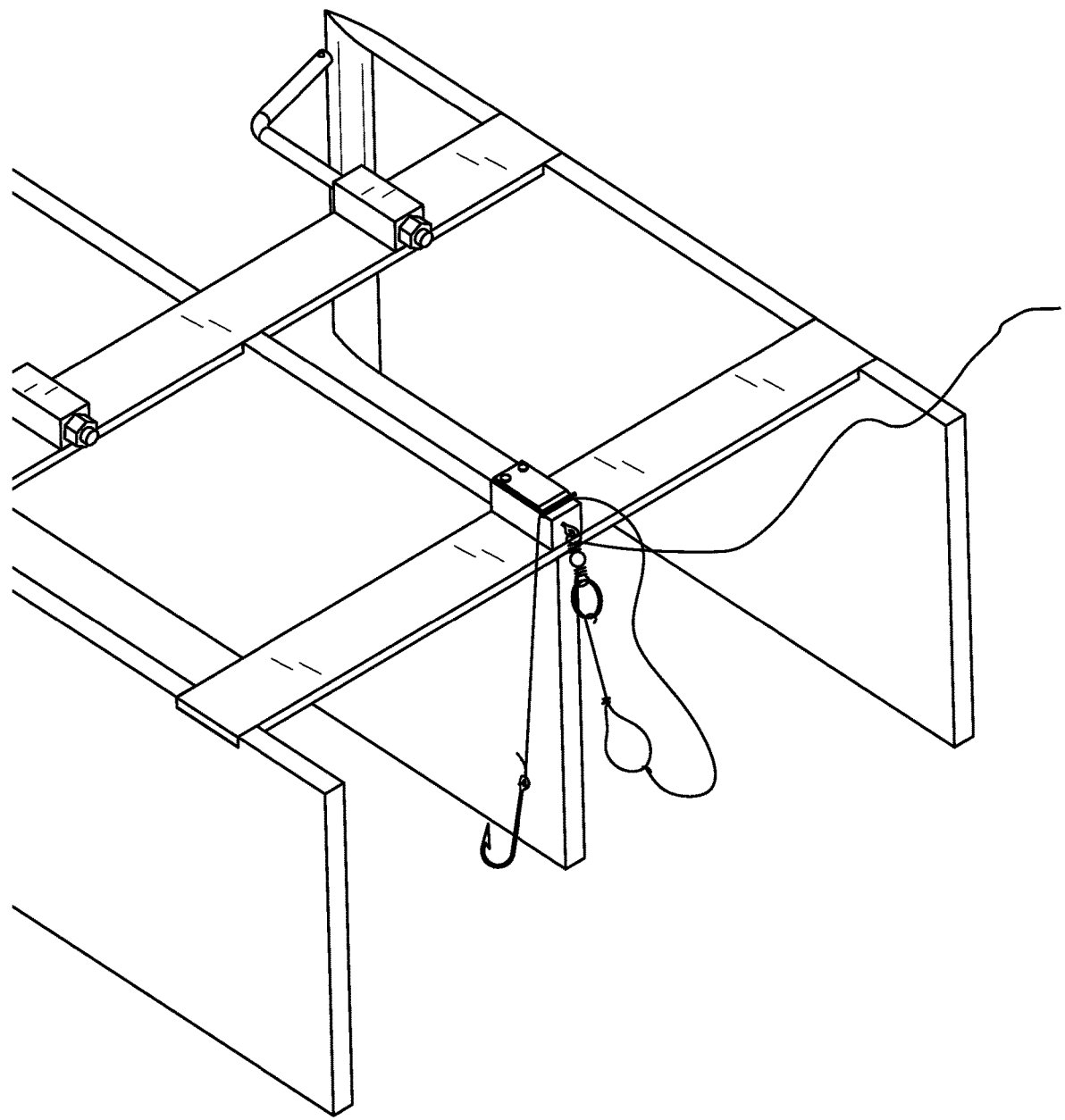
FIG. 6 shows another perspective view of the fishing catamaran in use.

In use, as illustrated in FIGS. 5 and 6, the catamaran may be connected to a fishing pole whereby the catamaran is bringing the bait end of the line to a desired location. The baited end portion of the fishing line is secured to one of the quick release mechanism or the flexible piece of miniature catamaran 100. When miniature catamaran 100 reaches a desired location, the quick release mechanism will release the baited end portion of the fishing line when pressure is applied.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the use contemplated. The scope of the invention is to be defined by the above claims.

What is claimed is:

1. A miniature multi-hulled watercraft with a quick release mechanism for remote casting, comprising:
   three components that extend downward into a body of water when floating and are parallel with another, wherein the three components include a first component on a first side, a second component on a second side, and a third component positioned between the first component and the second component, that extends farther forward than the first component and the second component;
   a first plank that is rectangle and elongated in shape and connected to and extends between a top surface of the first component and a top surface of the second component wherein the first plank extends over the third component;

a second plank connected to the top surface of the first component and the top surface of the second component and extends over the third component wherein the first plank is more forward than the second plank; and two protrusions on top of a top surface of the first plank for steering or guiding the miniature multi-hulled watercraft, wherein a first protrusion of the two protrusions is positioned laterally between the first component and the third component, wherein a second protrusion of the two protrusions is laterally positioned between the second component and the third component, wherein the first protrusion extends forward past the first plank and bends at an angle towards the first component and the second protrusion extends forward past the first plank and bends at an opposite angle to the angle towards the second component.

2. The miniature multi-hulled watercraft of claim 1, wherein the first component, the second component, and the third component have a rectangular shape with a narrowed portion at a front.

3. The miniature multi-hulled watercraft of claim 1, wherein the quick release mechanism includes a flexible piece placed on the top surface of the second plank, directly above the third component wherein the flexible piece has a fastener through the flexible piece into the miniature multi-hulled watercraft wherein ends of the flexible piece are stationary and lie flat unless a force is applied.

4. The miniature multi-hulled watercraft of claim 1, wherein the miniature multi-hulled watercraft is made of wood.

5. A miniature multi-hulled watercraft with a quick release mechanism for remote casting, comprising:

three components that extend downward into a body of water when floating and are parallel with another, wherein the three components include a first component on a first side, a second component on a second side, and a third component positioned between the first component and the second component, that extends farther forward than the first component and the second component;

a first plank that is rectangle and elongated in shape and connected to and extends between a top surface of the first component and a top surface of the second component wherein the first plank extends over the third component;

a second plank connected to the top surface of the first component and the top surface of the second component and extends over the third component wherein the first plank is more forward than the second plank; and two protrusions at a top surface of the first plank that are used to steer or guide the miniature multi-hulled watercraft, wherein a first protrusion of the two protrusions is positioned laterally between the first component and the third component, wherein a second protrusion of the two protrusions is laterally positioned between the second component and the third component, wherein the first component, the second component, and the third component have a rectangular shape with a narrowed portion at a front, wherein the first protrusion extends forward past the first plank and bends at an angle towards the first component and the second protrusion extends forward past the first plank and bends at an opposite angle to angle towards the second component, wherein the quick release mechanism includes a flexible piece placed on the top surface of the second plank, directly above the third component wherein the flexible piece has a fastener through the flexible piece into the miniature multi-hulled watercraft wherein ends of the flexible piece are stationary and lie flat unless a force is applied.

* * * * *